W. C. MERRILL.
PROCESS OF TREATING OLEAGINOUS MATERIALS.
APPLICATION FILED AUG. 5, 1908. RENEWED FEB. 19, 1912.
1,023,386.
Patented Apr. 16, 1912.
3 SHEETS—SHEET 3.
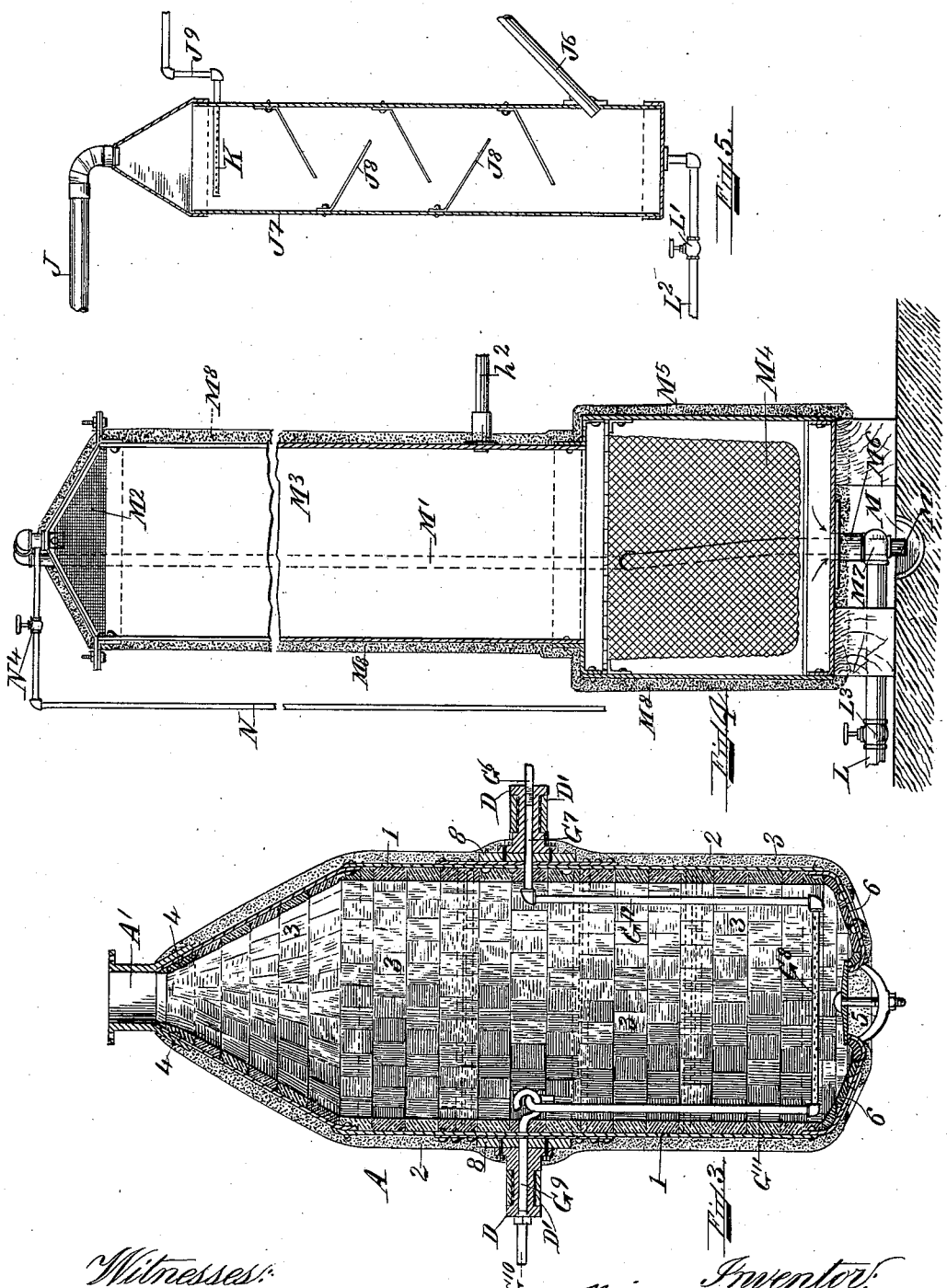

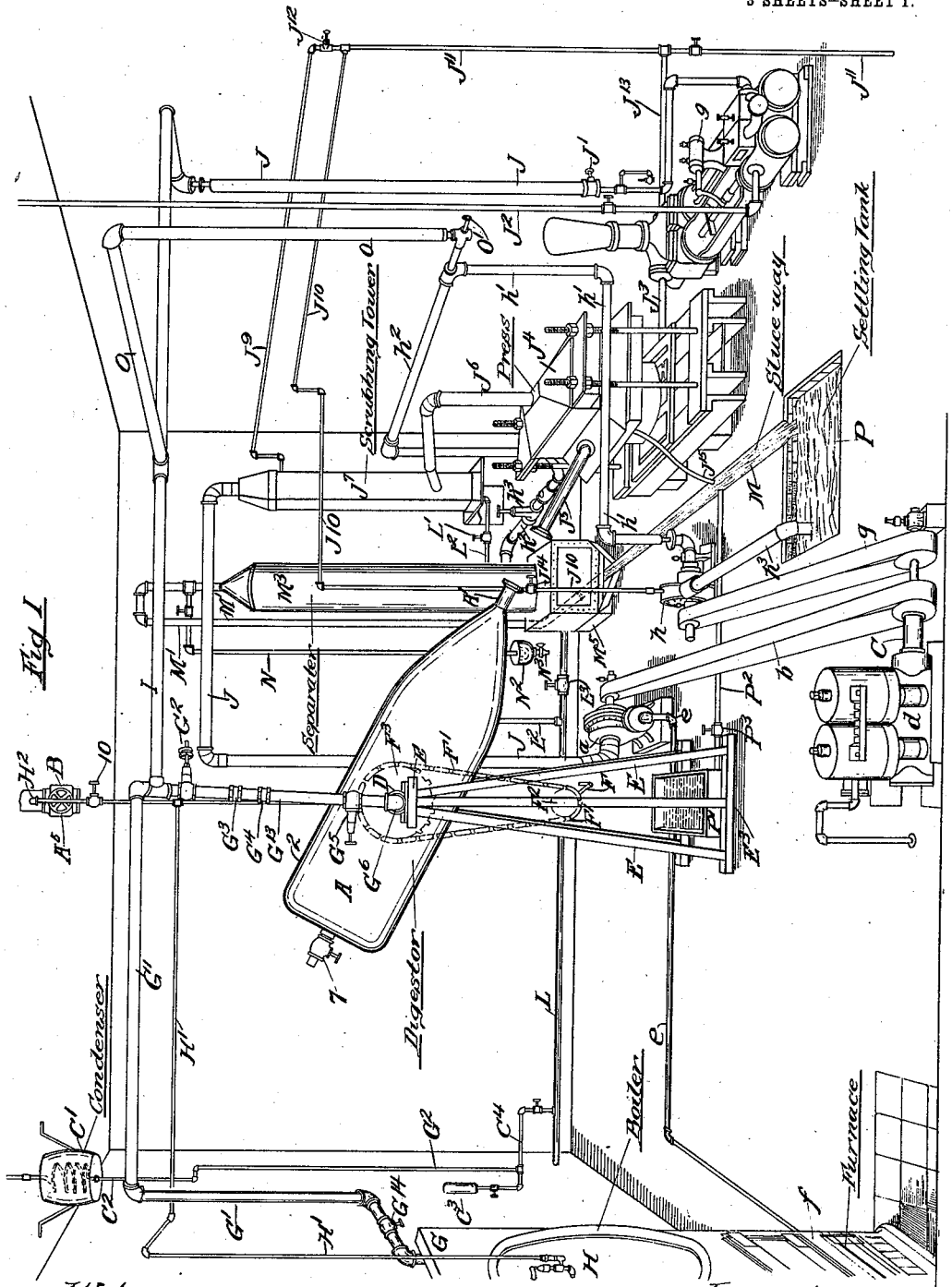

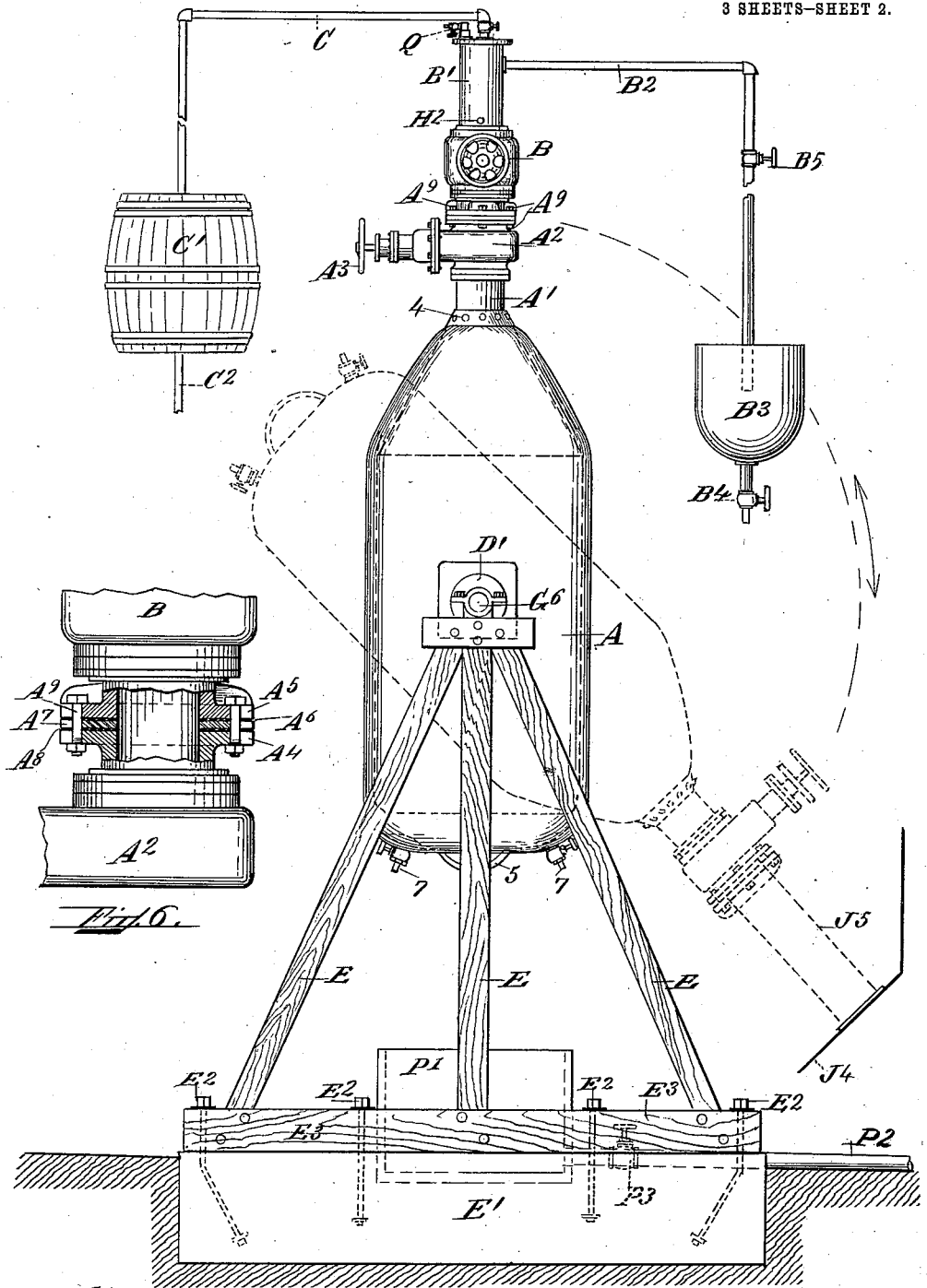

UNITED STATES PATENT OFFICE.

WILLIS C. MERRILL, OF BOSTON, MASSACHUSETTS.

PROCESS OF TREATING OLEAGINOUS MATERIALS.

1,023,386. Specification of Letters Patent. Patented Apr. 16, 1912.

Application filed August 5, 1908, Serial No. 447,085. Renewed February 19, 1912. Serial No. 678,749.

*To all whom it may concern:*

Be it known that I, WILLIS C. MERRILL, of Roxbury, Boston, in the county of Suffolk and State of Massachusetts, have invented certain new and useful Improvements in Processes of Treating Oleaginous Materials, of which the following is a specification.

My invention relates to new and useful process of treating oleaginous materials such as fish or fish scraps, animal offal and the like, such as city garbage, which consists of waste animal and vegetable material from the kitchens of private houses, hotels, etc. As is well known, garbage accumulates rapidly and must be frequently removed, especially in summer, to prevent it from becoming offensive and dangerous to the health of the public.

In many large cities it is still the custom to dispose of garbage in unsanitary ways, such as dumping it into the adjacent waters, plowing it into the ground, or feeding it to food animals. In all these cases, the public health is endangered and a nuisance created, and when it is dumped into the sea it is objectionable for the reason that much of it floats and is washed ashore. This dumping into the sea is further objectionable for the reason that the pollution of the waters causes the food fishes to leave their feeding grounds.

By my improved process for the treatment of garbage, as an example, it is deposited in digesters or tanks which when filled to a proper height are hermetically sealed and the inclosed material is then subjected to the action of live steam for a sufficient time to disassociate and disintegrate the mass causing the separation of the oleaginous material from the fibrous or organic matter and the grease or oleaginous matter rises to the top of the mass by reason of the differences in specific gravity of the materials in the tank. After the mass has been treated for a sufficient time to cause the separation, as above stated, the process is continued by cutting off the steam and introducing water to the mass which causes the lighter products to still further ascend passing from the digester or tank through proper connections to a suitable receptacle. After the grease has been separated from the mass, as above described, the digester is tilted or revolved until the neck of the tank is in intimate relation with the mouth of a press and the mass passes to the press where an additional amount of water and grease is expressed from the same, and the solid mass or tankage left in the press is removed and sold for fertilizer purposes. The tank is then further revolved to bring the open neck over a suitable receptacle, where crockery, glass, and other inorganic matter is dumped. The tank is then returned to its original position to receive a new charge for treatment.

In housekeeping, many foreign or inorganic articles such as oyster shells, broken crockery, spoons, iron and stones find their way into the garbage and are the cause of much expense and annoyance in the operation of utilization or reduction plants. To overcome this, the tank is slowly tilted or decanted permitting these heavy or foreign and inorganic articles to sink to the bottom and keeps them from the press; and such foreign substances also have a detrimental effect on the value of the residue or by-product, as tankage, as they cause annoyance in the further manufacture of the fertilizer from the product.

One of the principal objects of this process is to first separate as much light grease as possible from the mass before the tilting of the tank takes place, and then to tilt the tank and dump the material into the press where it is subjected to pressure and more grease is expressed, leaving the tankage as free as possible from grease. In this process, the contents of the tank are retained at its cooking temperature and the operation of the press made more effective, as the hotter the mass in the press the more complete the separation.

In the accompanying drawings which illustrate an apparatus in which my improved process is carried out, Figure 1 is a diagrammatic view of a plant for carrying out my invention and showing the tank in its revolving position on its way to deposit the mass for treatment into the press after as much grease has been removed from the top of the cooked mass in the digester as possible, with the valve and valve casing removed from the neck of the digester. Fig. 2 is a side elevation of one of the tanks showing same in full lines in the position it occupies when the material has been introduced for treatment. Fig. 3 is a sectional view of one of the tanks showing the pipe through which steam is first admitted to cook the material and through which after the steam is cut off, water is admitted to lift as much grease as possible to the top for removal. Fig. 4 is a sectional view of the separator which receives the grease from the presses after separation of the grease and water. Fig. 5 is a sectional view of the water tower or scrubber to condense the vapors rising from the hot pressed mass from the presses. Fig. 6 is a detail view partly in section showing the joint between the top of the digester and the chamber located above and also in the dotted lines of Fig. 2 the connection of the digester and the press.

Like letters of reference refer to like parts throughout the several views.

The digester or tank A consists of the metallic shell 1 and the outer covering 2 of asbestos or other heat-insulating material and the inner lining 3 of tile or cement for preventing wear on the metallic parts, due to the action of acids, gases, etc. rising from the garbage or other material under treatment. The upper end of the digester is provided with a neck $A'$ secured in place by suitable bolts 4 and the bottom of said tank is provided with the usual manhole covered by the plate 5 of usual construction; there are also provided two openings 6 in the bottom of the digester which may be provided with suitable valved outlets 7. Secured on opposite sides of the shell 1 by suitable bolts, are the plates 8 to which are secured the opposite journals D which are located in bearings $D'$ supported by posts E which in turn are supported by cross timbers $E^3$ secured to the bedplate $E'$ by suitable bolts $E^2$. At $G^{10}$ on the end of the rod $G^9$ is carried fast the gear wheel $F^3$ with which is adapted to mesh the chain $F'$ which passes down and around the gear wheel $F^2$ provided with the operating handle F, and said gear is mounted on the central post E of the supporting frame. By means of this handle F the digester may be tilted or revolved from its upright position into any tilted position desired. Carried by the rod $G^9$ is the pipe $G^{11}$ to which is secured one end of the perforated pipe $G^8$ which at its opposite end is supported by the pipe $G^{12}$ which in turn is connected with the pipe $G^7$ passing through one of the journals D and said pipe $G^7$ is in communication with the pipe $G^6$ which has a swivel connection with the valve casing $G^5$, Fig. 1, in the pipe $G^{13}$. In said pipe $G^{13}$ there are located the check valves $G^3$ and $G^4$ for preventing the return of steam or water back through the pipe $G^{13}$ and $G'$ to the boiler G. The pipe $G^6$ forms a swivel joint with the pipe $G^{13}$ so that the tank A may be revolved. There is also provided in said pipe $G^{13}$ the reducing valve $G^2$. The pipe $G'$ leading from the boiler G has a main controlling valve $G^{14}$ as shown whereby all the steam in the boiler may be cut off from the apparatus if desired.

With the parts in the position shown in full lines Fig. 2, if it be desired to load the digester A with garbage or like material to be treated, the valve B being closed and the valve $A^3$ open, the tank or digester A is tilted slightly to bring the neck $A'$ from alinement with the valve casing $A^2$, which is done (Fig. 6) by removing the bolts $A^9$, fiber packing $A^7$ and metal packing $A^6$ and $A^8$. The material to be treated is then dumped into the tank A until it is loaded to the proper capacity, when the tank is swung back into the position shown in full lines Fig. 2, and the packing and bolts referred to are restored to the positions shown in Fig. 6. The valve $A^3$ is then closed and the valve $G^{14}$ opened so that the steam passes from the boiler through the pipes $G'$, $G^{13}$, $G^6$, $G^7$, $G^{12}$ and $G^8$ into the bottom of the digester below the material. The material is cooked some three or four hours as required to separate the grease and other constituent parts, the steam having been cut off at the proper time. The valve $A^3$ is then opened and also the valve B to afford communication between the digester A and the grease chamber $B'$. The inspirator H of usual construction is then operated to cause hot water to flow from the boiler through the pipes $H'$ and $H^3$ thence to the pipe $G^{13}$ and through valve $G^5$, pipe $G^6$, pipe $G^{12}$ and perforated pipe $G^8$ percolating through the material lifting the grease up through the neck $A'$ past the valve $A^3$ and valve B into the chamber $B'$ over through the pipe $B^2$ into the grease receptacle $B^3$ provided with the valve-controlled outlet $B^4$. The pipe $H^2$ having a suitable valve 10 also receives its hot water supply from the pipe $H'$ and the water passes into the chamber $B'$ which arrangement may be used where it is desired to float off more grease from the chamber $B'$ while the cooking process is going on in the tank A, in which case both valves $A^3$ and B are closed.

When no more hot water is needed the supply is cut off by shutting off the inspirator H in the usual manner.

From the top of the chamber $B'$ there leads a pipe C through which the vapors rising from the tank A may pass into the condenser $C'$ and pass down by the pipe $C^2$ into the pipe $C^4$ and pipe L from which they pass into a sewer or other outlet.

When the attendant thinks sufficient grease has been floated up into the chamber $B'$, the valves $G^5$, $A^3$ and B are closed so that the grease remains in the chamber $B'$ or is forced into the pipe $B^2$ and receptacle $B^3$ by reason of the hot water entering into the bottom of the chamber B' from the pipe H² controlled by the valve 10. At the proper time, or when the grease has been floated out of the chamber B', the valve 10 may be closed or the inspirator H shut off.

With the valves A³ and B closed, the bolts A⁹ and packings A⁶, A⁷ and A⁸ are removed, and the digester is revolved or tilted to bring the neck A' and valve chamber A² into alinement with the pipe J⁵ of the hydraulic press J⁴ as indicated in dotted lines Fig. 2. The valve casing A² has been omitted in Fig. 1 in order not to hide in the drawing the other parts of the apparatus, but the connection is clearly shown in dotted lines Fig. 2. The valve casing A² and pipe J⁵ are connected in identically the same manner as shown in Fig. 6 forming a tight joint between the two, previous to opening the valve A³; when this joint has been made, the valve A³ is opened and the cooked mass with such grease as has not passed over by floating, as above described, passes into the pipe J⁵ and press J⁴ where the grease is pressed out and passes by the pipe J¹⁵ into the sluiceway M thence into the settling tank P. It is then taken by the pipe h³ and pump h and forced into the pipe h' thence into the pipe h² provided with a suitable gate valve h³ and thence into the separator M³ (see Figs. 1 and 4). The combined grease and water with such flocculent matter as escapes from the press are admitted to the separator M³ and separate into their constituent parts of different specific gravity, the heavier parts going into the flexible basket M⁴ secured in the box M⁵. The separator M³ is surrounded with a suitable heat-insulating or non-radiating material M⁸ so that the heat may be retained therein for the complete separation of the constituent parts.

The water and grease are separated by the difference in specific gravity, the grease going to the top through the strainer M² and being drained off through the pipe N (having a suitable valve N⁴) into the receptacle N² provided with a suitable valve-controlled outlet N³, the water remaining in the separator until such time as it is desired to remove the flexible basket containing the heavier products at which time the gate valve L³ is opened and the water passes down through the pipe M⁶ from the chamber M⁵ into the elbow M⁷ through the valve L³ and then through the pipe L to a suitable outlet sewer or otherwise. To provide for exigencies, the pipe M' is provided of suitable diameter to equal the inflow of combined material entering through the pipe h² and provides an overflow into the sluiceway M (see Fig. 4) returning to the tank P and then repeating the operation of separation.

The chamber M⁵ has a suitable door through which the flexible basket M⁴ may be removed to be cleaned out, and the contents together with the solid residue left in the press is removed for further treatment for fertilizer or otherwise.

The vapors rising from the solid mass in the press J⁴ are conducted through the pipe J⁶ into the scrubbing tower J⁷ passing around the baffle plates J⁸ over which a suitable amount of water from spray K runs from the pipe J⁹ (connected to the main water supply J¹¹ and having a suitable controlling valve J¹²) and making a water curtain through which the vapors pass up and out through the pipe J and down into the exhaust fan a through which they pass by the pipe e under the grate of the furnace f.

From the bottom of the scrubbing tower J⁷ there leads a pipe L² having a suitable controlling valve L' and through the pipes L² and L the water used as a condensing medium for the vapors from the scrubbing tower J⁷ flows to a sewer or suitable outlet. The flow of water and condensed vapors through the pipe L receives a mixture of disinfectant fluid from the container C³ (having a pipe C⁴) provided with suitable controlling valves leading from it, said container C³, to the pipe L.

The pump 9 receives its steam from the pipes C⁵ and J, which latter is suitably controlled by the valve J', the pump 9 being used to exert pressure on the press J⁴ operating the plunger or piston to compress the mass to express the grease and water from the mass in a manner similar to the hydraulic presses now in use; the pump 9 receives its water from the water main J¹¹ through the pipe J¹³ and by the pipe J³ passes to the press. This pump 9 has the usual exhaust J². The steam passing through the pipe O is drawn into the pipe h² and acts as a vacuum in assisting the pump to lift the load from the tank P which receives the grease from the press J⁴. The fan a and pump h are operated respectively by the belts b and g driven by the shaft c operated by a suitable motor d.

Before tilting the digester A as previously described, sufficient water is drawn off from the draw-offs 7 connected at 6 so that the liquid will fall below the valve A³ permitting the tank to be tilted.

From the pipe J¹¹ leads the pipe J¹⁰ into the top of the pump h which is a means of "priming" the pump with water to assist in the starting operation for lifting the load. The pipe J¹⁰ is provided with a valve J¹⁴.

The vapors are prevented from escaping into the atmosphere from the press after the digester is disconnected from the press and during the operation of pressing by the action of the exhaust fan a which creates a vacuum through the pipe j, scrubbing tower J⁷ and pipe J⁶. From the foregoing it will be apparent that all of the steps of the herein described process of reduction and disposition are carried out without exposing the material under treatment to the atmosphere, so that the objectionable feature of the vapors and steam rising from the cooked and cooking mass at any time during treatment is obviated, the system being a closed system in distinction to the open reduction systems now in use where the vapors and steam rise from the mass under treatment and fill the room creating objectionable odors.

It will be understood that in the operation of the plant the sluiceway M and the settling tank P are closed by suitable tight fitting covers.

In the garbage collected from cities, there is a large amount of foreign and inorganic material, as previously stated; in operating the digester A, it is tilted slowly so that the heavy and foreign articles sink to the lower side of the tank as it tilts and do not pass into the press. After the mass has passed into the press and the joint of the neck A' with the pipe J⁵ has been broken as described, the valve A³ is closed and the digester A is further revolved to bring the neck A' and valve A³ over a suitable receptacle P' when the valve A³ is opened and the foreign materials are dumped into said receptacle. After this, the tank is swung again into position to receive another load of untreated garbage, after which the neck A' is swung into the position shown in Fig. 2 and the operation is repeated.

The apparatus herein described and shown in the drawings is not claimed in this application, but forms the subject-matter of another application filed by me June 24, 1909, Ser. No. 504,105.

Having thus described my invention and shown in the drawings an apparatus embodying the same, and in which my process is carried out, what I claim as my invention is:

1. The herein-described process, which consists, first, in cooking the material in a closed vessel under fluid pressure to separate said material into its constituent parts, second, in cutting off the supply of fluid pressure, third, in removing the constituent of lightest specific gravity, fourth, in separately removing the inorganic solids and the cooked mass from said vessel, and lastly in depositing the cooked mass into a suitable receptacle in which the liquid constituents are separated.

2. The herein-described process, which consists, first, in cooking the material in a closed vessel under fluid pressure to separate said material into its constituent parts, second, in cutting off the supply of fluid pressure, third, in removing the constituent of lightest specific gravity, fourth, in separately removing the inorganic solids and the cooked mass from said vessel, fifth, in depositing the cooked mass into a suitable receptacle in which the liquid constituents are separated, and lastly in condensing and leading off the vapors arising from the material under treatment.

3. The herein-described process, which consists, first, in cooking the material in a closed vessel under fluid pressure to separate said material into its constituent parts, second, in cutting off the supply of fluid pressure, and lastly, in separately removing the cooked mass and the inorganic solids from said vessel.

4. The herein-described process, which consists, first, in cooking the material in a closed vessel under fluid pressure to separate said material into its constituent parts, second, in cutting off the supply of fluid pressure, third, in separately removing the cooked mass and the inorganic solids from said vessel, and lastly in condensing and leading off the vapors arising from the material under treatment.

5. The herein-described process, which consists, first, in cooking the material in a closed vessel under fluid pressure to separate said material into its constitutent parts, second, in cutting off the supply of fluid pressure, third, in separately removing the cooked mass and the inorganic solids from said vessel, fourth, in condensing and leading off the vapors arising from the material under treatment, and lastly, in disinfecting the condensed vapors.

6. The herein-described process, which consists, first, in cooking the material in a closed vessel under fluid pressure to separate said material into its constituent parts, second, in cutting off the supply of fluid pressure, third, in removing the grease from the top of the closed vessel, fourth, in separately removing the cooked mass and the inorganic solids from said vessel, fifth, in depositing the cooked mass in a suitable press in which the liquid constituents are expressed and pass to a suitable settling tank, sixth, in leading the liquid in the settling tank to a suitable separator to separate the grease from the water and other constituents of greater specific gravity, seventh, in leading the grease from the separator to a suitable receptacle, and lastly, in leading the water from said separator to a suitable outlet.

7. The herein-described process, which consists, first, in cooking the material in a closed vessel under fluid pressure to separate said material into its constituent parts, second, in cutting off the supply of fluid pressure, third, in removing the grease from the top of the closed vessel, fourth, in separately removing the cooked mass and the inorganic solids from said vessel, fifth, in depositing the cooked mass in a suitable press in which the liquid constituents are expressed and pass to a suitable settling tank, sixth, in leading the liquid in the settling tank to a suitable separator to separate the grease from the water and other constituents of greater specific gravity, seventh, in leading the grease from the separator to a suitable receptacle, eighth, in leading the water from said separator to a suitable outlet, and lastly, in condensing the vapors arising from said removed grease and from said press and leading the same to a suitable outlet.

8. The herein-described process, which consists, first, in cooking the material in a closed vessel under fluid pressure to separate said material into its constituent parts, second, in cutting off the supply of fluid pressure, third, in removing the grease from the top of the closed vessel, fourth, in separately removing the cooked mass and the inorganic solids from said vessel, fifth, in depositing the cooked mass in a suitable press in which the liquid constituents are expressed and pass to a suitable settling tank, sixth, in leading the liquid in the settling tank to a suitable separator to separate the grease from the water and other constituents of greater specific gravity, seventh, in leading the grease from the separator to a suitable receptacle, eighth, in leading the water from said separator to a suitable outlet, ninth, in condensing the vapors arising from said removed grease and from said press and leading the same to a suitable outlet, and lastly in leading the non-condensed vapors to a furnace.

9. The herein-described process, which consists, first, in cooking the material in a closed vessel under fluid pressure to separate said material into its constituent parts, and second, in subsequently removing the cooked mass and the inorganic solids separately from said vessel.

10. The herein-described process, which consists, first, in cooking the material in a closed vessel under fluid pressure to separate said material into its constituent parts, and second, in subsequently removing the constituent of lightest gravity, the cooked mass, and the inorganic solids, each separately from said vessel.

11. The herein described process, which consists, first, in cooking the material in closed vessel under fluid pressure to separate said material into its constituent parts, and second, in subsequently removing the grease, the cooked mass, and the inorganic solids, each separately from said vessel.

In testimony whereof, I have signed my name to this specification in the presence of two subscribing witnesses, this 31st day of July A. D. 1908.

WILLIS C. MERRILL.

Witnesses:
   A. L. MESSER,
   M. F. GOODHUE.

---

Copies of this patent may be obtained for five cents each, by addressing the "Commissioner of Patents, Washington, D. C."